United States Patent Office 3,127,359
Patented Mar. 31, 1964

3,127,359
POLY-(HETEROCYCLIC AMINES)
Walter E. Kramer, Niles, and Louis A. Joo, Crystal Lake,
Ill., assignors to The Pure Oil Company, Chicago, Ill.,
a corporation of Ohio
No Drawing. Filed Dec. 20, 1960, Ser. No. 77,016
20 Claims. (Cl. 260—2)

This invention relates to new and useful nitrogen-containing polymers derived from metal amides produced by reaction of an alkali metal with a heterocyclic aromatic amine such as pyridine, quinoline, acridine, etc.

During the period from 1914 to about 1921, there were reported in the literature the results of experimental work by Bruno Emmert on the reactions of pyridine with the alkali metals. Typical reports of this work are found in Berichte, 47, 2598 (1914); 49, 1060 (1916); 50, 31 (1917); 52, 1351 (1919); 53, 370 (1920); and 54, 204 (1921). In these publications, Emmert reported that sodium will react with pyridine to produce a disodium-dipyridyl compound. Emmert also reported the formation of similar compounds by reaction of sodium with other aromatic heterocyclic amines, such as quinoline, acridine, and the like. In the co-pending application of Walter E. Kramer, Louis A. Joo, and Robert M. Haines, Serial No. 28,866, filed May 13, 1960, a process is described in which a variety of dialkali metal amides are formed by reaction of alkali metals with aromatic heterocyclic amines, which compounds are converted to dibasic acid salts by reaction with carbon dioxide. The dibasic acids which are formed, and the various salts and derivatives thereof, are novel compounds previously not isolated in the literature. This invention is concerned with the preparation of polyamine resins from the alkali metal dipyridyl compounds and their analogs which are described in the aforementioned co-pending patent application of Kramer et al.

One of the objects of this invention is the provision of a novel process for the preparation of novel polymers from aromatic heterocyclic amines.

Another object of this invention is the provision of a novel class of resinous polymers derived from aromatic heterocyclic amines.

A feature of this invention is the provision of a process in which metal amides, prepared by reaction of alkali metals with aromatic heterocyclic amines, are reacted with dihalo $C_2$–$C_{20}$ hydrocarbons to produce a novel class of polyamine resins.

Another feature of this invention is the provision of a novel class of polyamine resins produced by reaction of alkali metal diamides of aromatic heterocyclic amines, with a dihalo $C_2$–$C_{20}$ hydrocarbon in an inert solvent at 0° to +100° C.

Other objects and features of this invention will become apparent from time to time throughout the specification and claims as hereinafter related.

This invention is based upon the discovery that certain compounds of the type described by Emmert, and described in the aforementioned co-pending patent application of Kramer et al., may be utilized in the preparation of novel polyamine resins. In our invention, alkali metals, such as sodium, potassium, lithium, etc., and mixtures thereof, such as sodium-potassium alloys, react with heterocyclic aromatic amines such as pyridine, quinoline, acridine, and the like, to form intermediate diamides of the formula:

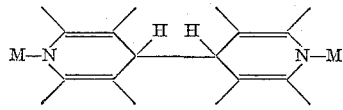

where M is an alkali metal, and the nitrogen-containing nuclei are derived from a heterocyclic aromatic amine. The intermediate diamide which is formed is reacted in solution in an inert solvent at a temperature in the range from about 0° to +100° C. with a dihalogenated $C_2$–$C_{20}$ saturated or mono-unsaturated hydrocarbon. In this reaction, an alkali metal halide precipitates as a by-product and is filtered off. There remains in solution a polymer having alternating groups of heterocyclic aromatic amine nuclei and hydrocarbon chains derived from the respective reactants. In some cases, the resinous polymer is precipitated from the solution along with the by-product alkali metal halide and the product must be purified by water washing.

In preparing the novel compounds of this invention, a dispersion of an alkali metal, such as sodium, lithium, potassium, or sodium-potassium alloys, is formed in an inert solvent. The solvent or reaction medium used is preferably a mineral oil, such as a white oil, although other inert solvents can be used, such as hydrogenated aromatic extracts of mineral oils, xylene, and ethers and acetals, such as diethyl ether, dipropyl ether, dioctyl ether, dimethoxyethane, methylal, dimethyl ether of diethylene glycol, etc. When liquid sodium-potassium alloys are used, a mixed sodium-potassium product is obtained and the solvent may be eliminated. The dispersion of the alkali metal in the inert solvent is then added to an aromatic heterocyclic amine, such as pyridine, quinoline, acridine, or derivatives thereof containing only inert substituents, e.g., picoline, lutidine, esters or salts of nicotinic acid, 2-benzylpyridine, 2,3,6-collidine, etc., while maintaining the reaction at a relatively low temperature, e.g., —50° to +100° C., preferably +50 to +100° C. Under these conditions, the alkali metal reacts with the aromatic heterocyclic amine, i.e., adds at the nitrogen atom, with the result that the aromatic amine dimerizes and there is formed a dialkali metal amide of the aromatic amine dimer. In the case of pyridine and sodium, the reaction is as follows:

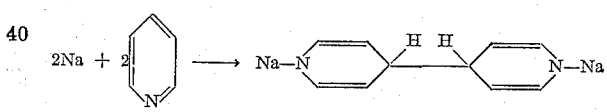

Since this reaction is one which takes place with all of the aromatic heterocyclic amines, we report the general reaction as follows:

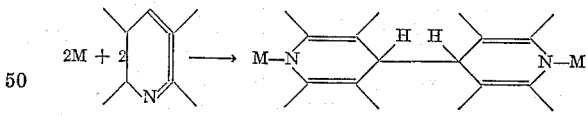

where M is an alkali metal, and

represents the nucleus of an aromatic heterocyclic amine.

After the intermediate alkali metal diamide of the aromatic amine is formed, it is reacted in solution with a dihalogenated saturated or mono-unsaturated $C_2$–$C_{20}$ hydrocarbon. In carrying out this reaction, any inert solvent may be used which is unreactive toward the reactants and which has physical properties which make it generally suitable as a reaction medium. Any of the solvents used in the preparation of the intermediate diamide may be used in the reaction which produces the product polyamine resins. This reaction between the intermediate diamide and dihalo-hydrocarbon may be carried out using any dihalo-hydrocarbon which does not contain unsaturated linkages which would be polymerized by free alkali metal. The reaction is therefore limited to dihalogenated alkanes, alkenes, and alkynes, as well as dihalo aromatic hydrocarbons or dihalo cycloaliphatic hydrocarbons which do not contain polymerizable double bonds. Compounds which may be used and which are illustrative of the scope of this reaction include ethylene dibromide, 1,3-dichloropropane, 1,4-dibromobutane, 1,5-diiodopentane, 1,10 - dichlorodecane, 1,20 - dichloroeicosane, p-dichlorobenzene, 2,6-dibromonaphthalene, 2,6-dibromoanthracene, 4,4'-dichlorodiphenyl, 1,4-dichlorocyclohexane, p-chlorobenzylchloride, 1-(O-chlorophenyl)-2-chloroethane, 1,4 - dichloro - 2 - butene, 1,18-dichloro-12-octadecene, 1,4-dichloro-2-butyne, 1,10-dichloro-2-decyne, and 1,3-dibromocyclohexene. In carrying out this process, we prefer to use a slight excess of the halogenated hydrocarbon so that the polymer chains terminate in halogen atoms rather than reactive sodium atoms.

The following non-limiting examples are illustrative of this invention:

*Example 1*

A sodium dispersion is prepared by heating two mols (45 g.) of sodium and 500 g. of xylene above the melting point of sodium with agitation. The dispersion is then cooled to about 50° C. and 300 ml. of pyridine are added, whereupon the solution turns yellow. After about 4–6 hours, one mol of 1,4-dichlorobutane is added dropwise. After all of the dihalide has been added, the mixture is stirred for an additional 4-hour period to assure completion of reaction and filtered to remove by-product sodium chloride. The filtrate is evaporated and a polymer is recovered. The polymer which is obtained in this reaction has the general formula:

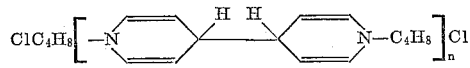

where $n$ is an integer, and is useful as a molding resin, as an ingredient of coating compositions, and an ion-exchange resin.

*Example 2*

A potassium dispersion is prepared by heating two mols (80 g.) of potassium and 500 g. of toluene above the melting point of potassium with agitation. The dispersion is then cooled to about 50° C. and 300 ml. of pyridine are added, whereupon the solution turns yellow. After about 4–6 hours, one mol of 1,4-dichloro-2-butene is added drop-wise. After all of the dihalide has been added, the mixture is stirred for an additional 4-hour period to assure completion of reaction and filtered to remove by-product potassium chloride. The filtrate is evaporated and a polymer is recovered. The polymer which is obtained in this reaction has the general formula:

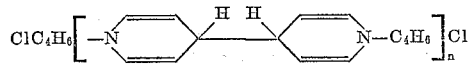

where $n$ is an integer. The removal of solvent is accomplished under vacuum in order to prevent cross-linking between the olefinic bonds of adjacent polymer chains. The resinous product which is obtained is an intermediate which is polymerized into a hard resin by heating with benzoyl peroxide (or other cross-linking agent). The resin which is obtained upon polymerization has good structural properties. The intermediate which is the product of our process is therefore useful as a casting or molding resin. The intermediate may also be used as an ingredient of coating compounds. The final resinous polymer obtained also has properties which make it suitable as an ion-exchange resin.

*Example 3*

A sodium-potassium alloy dispersion is prepared by heating two mols of sodium-potassium alloy (eutectic composition) and 500 g. of dimethoxyethane to a temperature of 35° C. with agitation. The dispersion is then warmed to about 50° C. and 300 ml. of pyridine are added, whereupon the solution turns yellow. After about 4–6 hours, one mol of 1,4-dichloro-2-butyne is added drop-wise. After all of the dihalide has been added, the mixture is stirred for an additional 4-hour period to assure completion of reaction and filtered to remove by-product sodium chloride and potassium chloride. The filtrate is evaporated and a polymer is recovered. The polymer which is obtained in this reaction has the general formula:

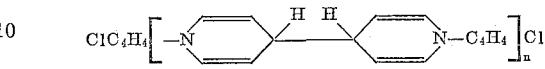

where $n$ is an integer. The removal of solvent is accomplished under vacuum in order to prevent cross-linking between the olefinic bonds of adjacent polymer chains. The resinous product which is obtained is an intermediate which is polymerized into a hard resin by heating with benzoyl peroxide (or other cross-linking agent). The resin which is obtained upon polymerization has good structural properties. The intermediate which is the product of our process is therefore useful as a casting or molding resin. The intermediate may also be used as an ingredient of coating compounds. The final resinous polymer obtained also has properties which make it suitable as an ion-exchange resin.

*Example 4*

A sodium dispersion is prepared by heating two mols (45 g.) of sodium and 500 g. of xylene above the melting point of sodium with agitation. The dispersion is then cooled to about 50° C. and 300 ml. of pyridine are added, whereupon the solution turns yellow. After about 4–6 hours, one mol of 1,10-dichlorodecane is added drop-wise. After all of the dihalide has been added, the mixture is stirred for an additional 4-hour period to assure completion of reaction and filtered to remove by-product sodium chloride. The filtrate is evaporated and a polymer is recovered. The polymer which is obtained in this reaction has the general formula:

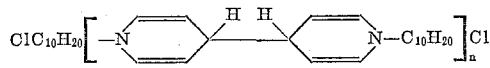

where $n$ is an integer, and is useful as a molding resin, as an ingredient of coating compositions and an ion-exchange resin.

*Example 5*

A sodium dispersion is prepared by heating two mols (45. g.) of sodium and 500 g. of xylene above the melting point of sodium with agitation. The dispersion is then cooled to about 50° C. and 300 ml. of pyridine are added, whereupon the solution turns yellow. After about 4–6 hours, one mol of 1,20-dichloroeicosane is added drop-wise. After all of the dihalide has been added, the mixture is stirred for an additional 4-hour period to assure completion of reaction and filtered to remove by-product sodium chloride. The filtrate is evaporated and a polymer is recovered. The polymer which is obtained in this reaction has the general formula:

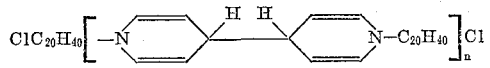

where $n$ is an integer, and is useful as a molding resin, as an ingredient of coating compositions, and an ion-exchange resin.

*Example 6*

A sodium dispersion is prepared by heating two mols (45 g.) of sodium and 500 g. of xylene above the melting point of sodium with agitation. The dispersion is then cooled to about 50° C. and 300 ml of pyridine are added, whereupon the solution turns yellow. After about 4–6 hours, one mol of p-dichlorobenzene is added drop-wise. After all of the dihalide has been added, the mixture is stirred for an additional 4-hour period to assure completion of reaction and filtered to remove by-product sodium chloride. The filtrate is evaporated and a polymer is recovered. The polymer which is obtained in this reaction has the general formula:

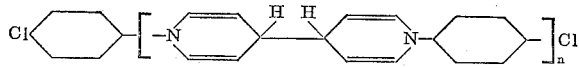

where $n$ is an integer, and is useful as a molding resin, as an ingredient of coating compositions, and an ion-exchange resin.

*Example 7*

A sodium dispersion is prepared by heating two mols (45 g.) of sodium and 500 g. of xylene above the melting point of sodium with agitation. The dispersion is then cooled to about 50° C. and 500 ml. of quinoline are added, whereupon the solution turns yellow. After about 4–6 hours, one mol of 1,4-dichlorobutane is added dropwise. After all of the dihalide has been added, the mixture is stirred for an additional 4-hour period to assure completion of reaction and filtered to remove by-product sodium chloride. The filtrate is evaporated and a polymer is recovered. The polymer which is obtained in this reaction has the general formula:

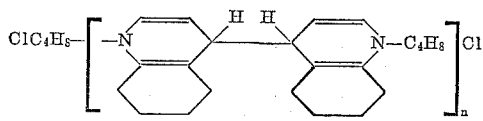

where $n$ is an integer, and is useful as a molding resin, as an integredient of coating compositions and an ion-exchange resin.

*Example 8*

A sodium dispersion is prepared by heating two mols (45 g.) of sodium and 500 g. xylene above the melting point of sodium with agitation. The dispersion is then cooled to about 50° C. and 600 g. of acridine are added, whereupon the solution turn yellow. After about 4–6 hours, one mol of 1,4-dichlorobutane is added drop-wise. After all of the dihalide has been added, the mixture is stirred for an additional 4-hour period to assure completion of reaction and filtered to remove by-product sodium chloride. The filtrate is evaporated and a polymer is recovered. The polymer which is obtained in this reaction has the general formula:

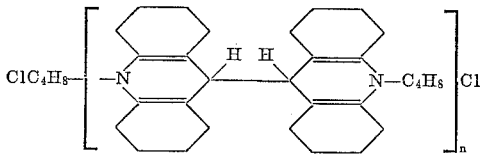

where $n$ is an integer, and is useful as a molding resin, as an ingredient of coating compositions, and an ion-exchange resin.

*Example 9*

A sodium dispersion is prepared by heating two mols (45 g.) of sodium and 500 g. of xylene above the melting point of sodium with agitation. The dispersion is then cooled to about 50° C. and 350 ml. of 2,6-lutidine are added, whereupon the solution turns yellow. After about 4–6 hours, one mol of 1,4-dichlorobutane is added dropwise. After all of the dihalide has been added, the mixture is stirred for an additional 4-hour period to assure completion of reaction and filtered to remove by-product sodium chloride. The filtrate is evaporated and a polymer is recovered. The polymer which is obtained in this reaction has the general formula:

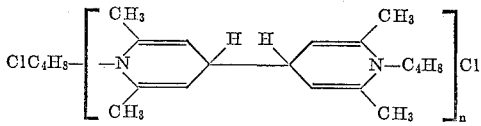

where $n$ is an integer, and is useful as a molding resin, as an ingredient of coating compositions, and an ion-exchange resin.

While we have described our invention fully and completely with special emphasis upon several preferred embodiments thereof, we wish it to be understood that other reactants within the general classes of reactants set forth above may be utilized in our process for the preparation of the novel nitrogen-containing resins which we have discovered. We therefore wish it to be understood that, within the scope of the appended claims, this invention may be practiced otherwise than as specifically described herein.

The embodiments of the invention in which an exclusive property or privilege is claimed are defined as follows:

1. A method of preparing polyamine resins which comprises reacting a dihalo-$C_2$–$C_{20}$ hydrocarbon with a compound of the formula:

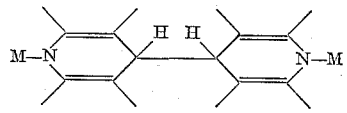

where M is an alkali metal, and

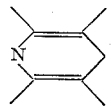

is a heterocyclic amine nucleus, in an inert liquid at 0° to 100° C.

2. A method in accordance with claim 1 in which the heterocyclic nucleus is selected from the group consisting of pyridine, quinoline, acridine, and substituted pyridine, quinoline and acridine, the substituents of which are inert toward alkali metals.

3. A method in accordance with claim 1 in which M is selected from the group consisting of sodium, potassium, and mixtures thereof.

4. A method in accordance with claim 1 in which the halohydrocarbon reactant is a saturated dihalohydrocarbon and a resin is obtained by separation of by-product metal halide followed by evaporation of the liquid reaction medium.

5. A method in accordance with claim 1 in which the halohydrocarbon reactant is a mono-unsaturated dihalohydrocarbon, and an unsaturated intermediate polymer is recovered from solution.

6. A method of preparing polyamine resins which comprises reacting 1,4-dichlorobutane with:

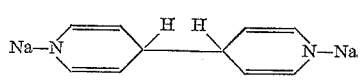

in an inert solvent at 0° to 100° C., filtering out by-product sodium chloride, and evaporating the solvent to recover the product polymer.

7. A method of preparing polyamine resins which comprises reacting 1,4-dichloro-2-butene with:

in an inert solvent at 0° to 100° C., filtering out by-product sodium chloride, and evaporating the solvent to recover the product polymer.

8. A method of preparing polyamine resins which comprises reacting 1,4-dichloro-2-butyne with:

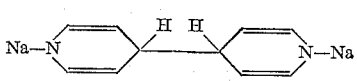

in an inert solvent at 0° to 100° C., filtering out by-product sodium chloride, and evaporating the solvent to recover the product polymer.

9. A method of preparing polyamine resins which comprises reacting 1,10-dichlorodecane with:

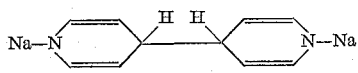

in an inert solvent at 0° to 100° C., filtering out by-product sodium chloride, and evaporating the solvent to recover the product polymer.

10. A method of preparing polyamine resins which comprises reacting 1,20-dichloroeicosane with:

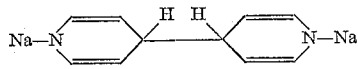

in an inert solvent at 0° to 100° C., filtering out by-product sodium chloride, and evaporating the solvent to recover the product polymer.

11. A method of preparing polyamine resins which comprises reacting p-dichlorobenzene with:

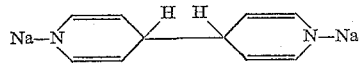

in an inert solvent at 0° to 100° C., filtering out by-product sodium chloride, and evaporating the solvent to recover the product polymer.

12. A method of preparing polyamine resins which comprises reacting 1,4-dichlorobutane with:

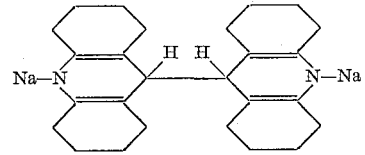

in an inert solvent at 0° to 100° C., filtering out by-product sodium chloride, and evaporating the solvent to recover the product polymer.

13. A method of preparing polyamine resins which comprises reacting 1,4-dichlorobutane with:

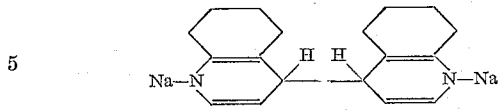

in an inert solvent at 0° to 100° C., filtering out by-product sodium chloride, and evaporating the solvent to recover the product polymer.

14. A method of preparing polyamine resins which comprises reacting 1,4-dichlorobutane with:

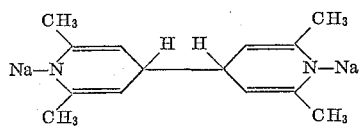

in an inert solvent at 0° to 100° C., filtering out by-product sodium chloride, and evaporating the solvent to recover the product polymer.

15. The polyamine resin prepared in accordance with claim 1.
16. The polyamine resin prepared in accordance with claim 2.
17. The polyamine resin prepared in accordance with claim 4.
18. The polyamine resin prepared in accordance with claim 5.
19. The polyamine resin prepared in accordance with claim 6.
20. The polyamine resin prepared in accordance with claim 7.

References Cited in the file of this patent

Emmert et al.: Berichte, volume 54B, pages 204–209 (1921).

UNITED STATES PATENT OFFICE
CERTIFICATE OF CORRECTION

Patent No. 3,127,359　　　　　　　　　　　　　March 31, 1964

Walter E. Kramer et al.

It is hereby certified that error appears in the above numbered patent requiring correction and that the said Letters Patent should read as corrected below.

Column 2, lines 47 to 51, the left-hand portion of the formula should appear as shown below instead of as in the patent:

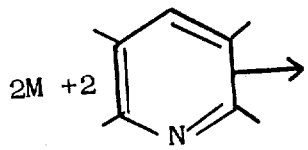

column 2, lines 53 to 57, the formula should appear as shown below instead of as in the patent:

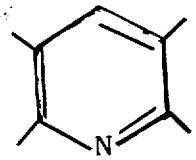

column 5, line 30, for "integredient" read -- ingredient --; line 38, for "turn" read -- turns --.

Signed and sealed this 15th day of September 1964.

(SEAL)
Attest:

ERNEST W. SWIDER
Attesting Officer

EDWARD J. BRENNER
Commissioner of Patents